3,442,697
ADHERENT CELLULOSE FILM COMPRISING NEGATIVELY CHARGED ALDEHYDE
William P. Kane, Bon Air, Va., assignor to E. I. du Pont de Nemours and Company, Wilmington, Del., a corporation of Delaware
No Drawing. Filed Dec. 28, 1965, Ser. No. 517,117
Int. Cl. B44d 1/14, 1/20; C08d 13/16
U.S. Cl. 117—145                                    14 Claims

ABSTRACT OF THE DISCLOSURE

Positively charged regenerated cellulose film characterized by improved adhesion comprising cationic additive and negatively charged aldehyde polymer and process for its preparation.

---

This invention relates to moisture-proof, transparent sheet wrapping materials and more particularly to non-fibrous cellulose films having improved anchorage properties.

For many applications the successful use of regenerated cellulose film requires that it have an additional moisture-proof coating that remains firmly adherent to the base cellulose film in a highly humid atmosphere. Heretofore, attempts to obtain such adherence have centered on incorporating in the cellulose film a small amount of an amino-resin such as those based on melamine/formaldehyde or urea/formaldehyde. While initial coating adhesion or anchorage is improved by using such resins, the adherence of the coating substantially diminishes on prolonged exposure to a moist atmosphere. Additionally, the use of such amino-resins is undesirable due to their tendency to liberate free formaldehyde.

However, there has now been developed an improved film which basically comprises a positively charged regenerated cellulose base film impregnated with at least 0.2 weight percent of a negatively charged aldehyde polymer having an intrinsic viscosity of at least 0.5. This improved film possesses greatly enhanced anchorage properties exemplified by the fact that a coating applied thereto remains firmly adhered for prolonged periods of exposure in a moist atmosphere.

The regenerated cellulose base film is conveniently made by the conventional viscose process as described in U.S. Patent 1,548,864 and U.S. Patent 1,601,289. In this process, viscose is forced through an elongated orifice in the form of a sheet into a coagulating bath and then cast into a film by any well known technique. Subsequently, the film is regenerated, washed, desulfured, bleached, softened, and dried.

To be useful in the present invention the regenerated cellulose base film must possess a positive charge. Suitable positive charging of the base film can be accomplished in several ways. One method involves adding to the viscose, prior to its being cast into a film, a polymer that is cationic in nature. Amine type polymers such as dimethyl amino methacrylate and polyethylene imine are particularly suitable when an acid coagulating bath is used. The amount and nature of the particular polymer must be controlled so that gelation of the viscose is effectively avoided and, therefore, in most instances, greater than one weight percent of polymer in the viscose is undesirable. An additional manner by which the base film can be positively charged will be set forth hereinafter.

While the invention is discussed primarily with regard to regenerated cellulose films prepared by the viscose process, the invention is applicable to cellulose films made by the cuprammonium process, the denitration of nitrocellulose or from solutions of cellulose in organic or inorganic solvents. The invention is also applicable to hydrophilic pellicular materials in general. These include films of cellulose ethers, especially the alkali soluble but water insoluble cellulose ethers formed by reacting cellulose with ethylene oxide, methyl chloride or ethyl chloride.

Similarly, the improved properties of the film of this invention are not dependent on the relative pliancy of the film. However, for most applications such pliancy is desirable and thus the improved regenerated cellulose film of this invention generally contains softening agents such as glycerol, ethylene glycol, or propylene glycol in an amount from 5 to 25 weight percent. Obviously, other modifications (e.g., dyeing) of the film which do not detract from its basic properties can be employed.

To obtain the improved film of this invention a positively charged regenerated cellulose base film is impregnated with a negatively charged aldehyde polymer. Useful aldehyde polymers and their methods of preparation are disclosed in U.S. Patent 3,079,296 and U.S. Patent 3,079,357. While an aldehyde polymer prepared from acrolein is preferred, any of the polymers suggested in the above references can also be used in the present invention. Thus, useful aldehyde polymers have an intrinsic viscosity of at least 0.5 and can be prepared from a variety of alpha, beta-ethylenically unsaturated aldehyde monomers either with or without minor amounts of an additional monoethylenically unsaturated monomer. Similarly, any of the polymerization methods as particularly disclosed in U.S. Patent 3,079,357 can be used for preparing the useful aldehyde polymers. As stated in U.S. Patent 3,079,357 values of intrinsic viscosity are determined by polyelectrolyte viscosity measurements at 25° C. on the solubilized polymer.

As employed in the present invention the above described aldehyde polymer is applied to the regenerated cellulose base film in a water solubilized form in which the polymer bears a negative charge. The preparation of the water solubilized negatively charged polymer can be accomplished by adding the polymer to an aqueous solution saturated with sulfur dioxide or containing an alkali bisulfite, such as sodium bisulfite. The concentration of the solubilized polymer in the acqueous solution is at least 0.3 weight percent and preferably does not exceed 3 weight percent though higher concentration can be used.

When the regenerated cellulose base film is positively charged as described previously (i.e., with an amine type polymer), the improved film of this invention can be prepared by impregnating the positively charged base film, while still in the gel state (i.e., before drying), with the aqueous solution of the water solubilized aldehyde polymer followed by drying the impregnated film. In practice the impregnation and softening steps can be conveniently combined by passing the positively charged gel regenerated cellulose film through an aqueous bath containing both the desired softening agent and the solubilized aldehyde polymer.

As previously mentioned other methods can be used to impart the necessary positive charge to the regenerated cellulose base film. A particularly preferred procedure involves impregnating the regenerated cellulose base film with an aqueous solution of a water soluble aluminum salt. While the aqueous solution containing the aluminum salt can be applied to the cellulose film at any time prior to the aldehyde polymer application, it is most convenient to simply dissolve the salt in the bath containing the softener and the solubilized aldehyde polymer and then simply pass the regenerated cellulose film, in the gel state, through the bath. An amount of aluminum salt in the bath of at least 0.05 and preferably not more than 1 weight percent, based on the total weight of the bath, can be successfully used. Examples of useful aluminum salts are aluminum acetate, aluminum formate, aluminum gluconate, aluminum lactate and aluminum sulfate.

As is clearly evident from the above discussion, the improved film of this invention can be prepared by a variety of methods, the essential feature being that the application of the aldehyde polymer occur subsequent to, or concurrent with, the positive charging of the regenerated cellulose base film. To obtain good anchorage properties the negatively charged aldehyde polymer is present in the dried film to an amount of at least 0.2 weight percent. The best results, however, are obtained when the amount of aldehyde polymer is at least 0.3 weight percent and preferably does not exceed 1 weight percent in the dried film. Similarly, the amount of either the amine type polymer or aluminum cation used to impart the necessary positive charge to the base film should be sufficient to substantially neutralize the negatively charged aldehyde polymer.

A preferred method of preparing the improved film of this invention is given in Example 1.

Example 1

A one mil regenerated cellulose film is prepared according to the viscose process of U.S. Patent 1,548,864. After regeneration, washing, desulfurization, and bleaching the film, while still in the gel state, is passed through an aqueous bath at a temperature of 75° F. containing 0.5 weight percent polyacrolein, 0.1 weight percent aluminum acetate, and 10 weight percent glycerol. The polyacrolein polymer used is that obtained from Shell Development Company under the trade name "Aldomer" 110–B. This polymer is characterized as being an anionic water soluble polymer derived from the reaction of sodium bisulfite with polyacrolein and has an intrinsic viscosity of 0.5. The effective dwell time of the regenerated cellulose film in the aqueous bath is about five sec. and after passing through the bath the film is dried. The dried film of this example contains about 0.3 weight percent polyacrolein.

The improved properties of the film of Example 1 are demonstrated by applying a variety of coatings to the dried film followed by testing the coated films for heat seal strength, cold peel strength, and anchorage grade. These tests are conducted according to the following methods:

Heat seal strength is measured by cutting a piece of the coated film 4" by 10" with the grain running in the long or machine direction into two pieces 4" by 5" each. The two pieces are superimposed so that opposite surfaces are in contact. The two pieces of superimposed film are then sealed together at each end at right angles to the grain. A ¾" wide sealing bar heated to a temperature of 140° C. at 5 p.s.i. pressure contacts the ends for ¼ second. The sealed sheets are then cut in half at right angles to the grain. From the center of the two resulting pieces, 1½" wide strips parallel to the grain are cut. The resulting four sets of strips are tested by opening at the free ends, placing them in a Suter testing machine and pulling them apart. The highest force in grams required to pull the strips apart is taken as a measure of the heat seal bond strength. Prior to testing, the coated films are conditioned for 24 hours at 35% relative humidity (RH) and 81% RH, respectively.

Cold peel strength is measured by attempting to lift the coating from the base film with a sharp edged instrument such as a knife. If the coating can not be lifted without rupture of the coating itself, the bond is labelled "No peel" (NP). If the coating can be lifted, a one inch wide strip of adhesive tape is attached to the loosened strip which is then pulled off at an angle of 180°. The bond so obtained can be labelled "can peel" or the actual force required to pull off the strip of coating can be recorded. Prior to testing the coated films are conditioned for 24 hours at 25% RH and 81% RH, respectively.

Anchorage refers to the adhesion of the coating to the base film when in direct contact with water. Samples of the coated film are suspended in water at 45° C. for 16 hours and then graded approximately as follows:

Grade 1—No blisters
Grade 2—Few blisters
Grade 3—Decided blistering
Grade 4—Coating sloughs off at blistered or unblistered portions The particular coatings applied to the film of Example 1 are given in Table I. The coatings are applied to both sides of the improved film to a thickness of .05 mil on each side.

TABLE I

Coating 1—Vinylidene chloride/acrylonitrile/methyl methacrylate/itaconic acid copolymer (91.5/5/6/2/0.5), applied as an aqueous dispersion.
Coating 2—Nitrocellulose coating composition as described in U.S. Patent 2,931,732 (Example 1), applied in toluene/tetrahydrofuran solvent.
Coating 3—Vinyl chloride polymer, applied in toluene/tetrahydrofuran solvent.
Coating 4—Ethylene polymer ("Alathon"[1]-1550 characterized as being a low density polyethylene resin applied by melt extrusion).

Table II presents the results of the above described tests.

TABLE II

| Coating | Heat seal | | Cold peel | | Anchorage grade |
| --- | --- | --- | --- | --- | --- |
| | 35% RH | 81% RH | 35% RH | 81% RH | |
| 1 | 280±20 | 175±15 | NP | NP | 3 |
| 2 | 850±30 | 150±10 | NP | NP | 1 |
| 3 | 190±40 | 130±15 | NP | NP | 1-1 |
| 4 | 1,800±30 | 450±50 | NP | NP | 1 |

Comparative tests using a film prepared as in Example 1 except that no aluminum salt was present in the softener bath gave very poor cold peel and anchorage grade results when coated with the above coatings. On the other hand, results essentially the same as given in Table II were obtained when there was added to the viscose 0.03 weight percent polyethylene imine followed by casting into film and then passing the gel film through a bath as in Example 1 without any aluminum salt.

What is claimed is:
1. A film comprising regenerated cellulose base film positively charged by having a cationic additive incorporated therein and impregnated with at least 0.2 weight percent of a negatively charged polymer prepared from alpha, beta-ethylenically unsaturated aldehyde, the polymer having an intrinsic viscosity of at least 0.5.
2. The film of claim 1 wherein the amount of aldehyde polymer in the cellulose base film is between about 0.3 weight percent and 1 weight percent.
3. The film of claim 2 wherein the aldehyde polymer is prepared from acrolein.
4. The film of claim 3 wherein the aldehyde polymer has an intrinsic viscosity of about 0.5 and is present in the cellulose base film in an amount of about 0.3 weight percent and wherein the regenerated cellulose base film is positively charged by having an aluminum salt impregnated therein.
5. The film of claim 1 having a coating thereon.
6. The film of claim 5 wherein the coating is a vinylidene chloride copolymer, a nitrocellulose composition, a vinyl chloride polymer, or an ethylene polymer.
7. The process comprising (A) impregnating a regenerated cellulose film, in the gel state, with an aqueous solution containing at least 0.3 weight percent of polymer prepared from alpha,beta-ethylenically unsaturated aldehydes, the polymer having an intrinsic viscosity of at least 0.5 and at least .05 weight percent aluminum salt and (B) drying the impregnated film.

[1] Registered trademark of E. I. du Pont de Nemours & Company.

8. The process of claim 7 wherein the aqueous solution contains not more than 3 weight percent aldehyde polymer and not more than 1 weight percent aluminum salt.

9. The process of claim 8 wherein the aqueous solution additionally contains a softening agent.

10. The process of claim 9 wherein the aldehyde polymer is prepared from acrolein and the aluminum salt is aluminum acetate.

11. The process of claim 10 wherein the aldehyde polymer has an intrinsic viscosity of 0.5 and wherein the aqueous solution contains 0.5 weight percent of this polymer and 0.1 weight percent of aluminum acetate.

12. The process of claim 7 with the additional step of (C) applying a coating to the dried film.

13. The process of claim 12 wherein the coating is a vinylidene chloride copolymer, a nitrocellulose composition, a vinyl chloride polymer, or an ethylene polymer.

14. The process comprising (A) impregnating a regenerated cellulose film, which is positively charged by having a cationic additive incorporated therein and in the gel state, with an aqueous solution containing at least 0.3 weight percent of polymer prepared from alpha,beta-ethylenically unsaturated aldehyde, the polymer having an intrinsic viscosity of at least 0.5 and (B) drying the impregnated film.

References Cited

UNITED STATES PATENTS

| | | | |
|---|---|---|---|
| 2,715,078 | 8/1955 | Cohen | 117—56 |
| 2,823,141 | 2/1958 | Hagan et al. | 117—56 X |
| 2,907,678 | 10/1959 | Bodmer et al. | 117—56 X |
| 3,079,296 | 2/1963 | Houff et al. | 117—155 X |
| 3,079,357 | 2/1963 | Fischer | 260—79.3 X |
| 3,101,276 | 8/1963 | Hendricks | 117—56 |
| 3,110,621 | 11/1963 | Doggett et al. | 117—218 |
| 3,129,195 | 4/1964 | June et al. | 117—144 X |
| 3,132,962 | 5/1964 | Seymour | 117—17.5 X |
| 3,256,811 | 6/1966 | Bach | 117—17.5 X |

WILLIAM D. MARTIN, *Primary Examiner.*

M. LUSIGNAN, *Assistant Examiner.*

U.S. Cl. X.R.

117—56, 76